United States Patent
Szydlowski et al.

(10) Patent No.: US 6,306,354 B1
(45) Date of Patent: Oct. 23, 2001

(54) SHIFT CONVERTER

(75) Inventors: Donald F. Szydlowski, Ellington; Thomas J. Corrigan, Vernon; Dale W. Blake, Glastonbury; Richard A. Sederquist, Newington, all of CT (US)

(73) Assignee: International Fuel Cells, LLC, S. Windsor, CT (US)

( * ) Notice: Subject to any disclaimer, the term of this patent is extended or adjusted under 35 U.S.C. 154(b) by 0 days.

(21) Appl. No.: 08/651,160

(22) Filed: May 17, 1996

(51) Int. Cl.[7] .................................................... F28D 7/04
(52) U.S. Cl. ........................ 422/200; 422/190; 422/191; 422/198
(58) Field of Search ................................. 422/190, 191, 422/200, 173, 198; 423/655, 656; 252/373

(56) References Cited

U.S. PATENT DOCUMENTS

| | | | |
|---|---|---|---|
| 2,078,948 | * 5/1937 | Houdry | 422/200 |
| 3,825,501 | * 7/1974 | Muenger | 423/655 |
| 4,476,683 | * 10/1984 | Shah et al. | 423/655 |
| 5,464,606 | * 11/1995 | Buswell et al. | 422/190 |

* cited by examiner

Primary Examiner—Hien Tran
(74) Attorney, Agent, or Firm—William W. Jones

(57) ABSTRACT

A fuel cell power plant, generally, has a fuel cell stack for electrochemically converting a hydrocarbon fuel into electricity. In order for the hydrocarbon fuel to be used by the fuel cell stack, it must be steam reformed into a hydrogen-rich process gas. This process gas has a carbon monoxide level that would be detrimental to the fuel cell stack, so the process gas is passed through a shift converter to decrease the carbon monoxide level therein prior to feeding the process gas to the fuel cell stack. In order to decrease the level of carbon monoxide without the need to increase the size of the shift converter catalyst bed, or lower the temperature of the process gas as it enters the shift converter to an undesirably low temperature, the shift converter design that utilizes an upstream adiabatic zone and a downstream actively cooled zone. The actively cooled zone is cooled by a pressurized water coolant which boils as it cools the process gas stream. The coolant entering the shift converter is essentially a single phase water stream, and the coolant exiting the shift converter is a two phase water-steam mixture.

4 Claims, 2 Drawing Sheets

SHIFT CONVERTER

TECHNICAL FIELD

The present invention relates to hydrocarbon fuel processing, and more particularly to an improved shift converter which employs a two stage or two zone process gas treatment catalyst bed or beds.

BACKGROUND ART

Fuel cell power plants which utilize a fuel cell stack for producing electricity from a hydrocarbon fuel are well known in the art. Each cell in the fuel cell stack includes an anode, a cathode, and an electrolyte disposed there between. Both the anode and the cathode utilize various well known catalysts. In order for the hydrocarbon fuel to be useful in the fuel cell stack's operation, it must first be converted to a hydrogen-rich stream. Hydrocarbon fuels which are used by the fuel cell stack pass through a steam reforming process to create a process gas having an increased hydrogen content which is introduced into the fuel cell stack. The resultant process gas contains hydrogen, carbon dioxide, and carbon monoxide. The process gas has about 10% carbon monoxide (on a dry basis) upon exit from the steam reformer.

Since the anode catalyst of a phosphoric acid fuel cell stack can be poisoned by a high level of carbon monoxide, the level of carbon monoxide in the process gas must be reduced prior to flowing the process gas to the fuel cell stack. This is conventionally done by passing the process gas a through a low temperature shift converter prior to flowing the process gas to the fuel cell stack. The shift converter also increases the yield of hydrogen in the process gas.

Shift converters for reducing the carbon monoxide content of process gas are conventional, and typically comprise a chamber having an inlet, a catalyst bed consisting of copper/zinc oxide pellets, a perforated plate or screen to support the catalyst and a gas outlet downstream of the bed. In operation, a low temperature shift converter carries out an exothermic shift conversion reaction represented by the following equation:

$$CO+H_2O \rightarrow CO_2+H_2 \quad (1)$$

The reaction (1) between the carbon monoxide and water concurrently reduces the carbon monoxide content and increases the carbon dioxide and hydrogen content of the process gas. The generation of additional hydrogen from this reaction is an advantage to the power plant since hydrogen is consumed at the fuel cell anode to produce power. Since the shift conversion reaction is exothermic, the heat of reaction increases the temperature of the process gas as it passes through the catalyst bed. The shift conversion reaction should take place within a suitable temperature range, preferably between 275° F. and 550° F., so that the shift conversion catalyst bed is most efficient. If the catalyst bed temperature is too low, the reaction proceeds too slowly. If the temperature is too high, the catalyst can be damaged by thermal sintering. Excessively high temperatures also limit the equilibrium conversion resulting in too high an exit carbon monoxide level. In order for the shift conversion reaction to take place within the aforesaid desired temperature range, the shift conversion catalyst bed must be maintained at proper temperatures.

In the prior art, there are actively-cooled and adiabatic shift converters. The former has a means for actively cooling the shift converter while the latter does not. Both types of shift converters must be designed to meet two major operating parameters, which are reducing the carbon monoxide to a minimum level within the effluent and creating an effluent gas having an outlet temperature below the critical temperature, the critical temperature being the exit temperature above which damage to the fuel cell may occur. This effluent or exit temperature is typically about 425° F. Exit temperatures above this level may require an additional process heat exchanger to cool the process gas before entering the fuel cell. It is also desirable to operate the exit end of the shift converter at or near this critical temperature level as this will insure a low carbon monoxide content. Below this temperature level, the reaction rate is slower requiring additional catalyst volume to achieve the same level of carbon monoxide in the effluent.

Desirably, the shift converter should produce an effluent gas stream having a carbon monoxide level of less than 1%. The carbon monoxide levels in the effluent of the actively-cooled, low temperature shift converters are about 0.2% to 0.3%, while they are about 0.3% to 0.5% in the effluent of the adiabatic low temperature shift converters, both of which are acceptable. The selection of an adiabatic or actively-cooled bed may not result in the most efficient use of catalyst resulting in the smallest required catalyst volume. With the adiabatic bed, the inlet temperature must be low enough to prevent the exit temperature from exceeding the critical outlet temperature. The low average temperature in the bed results in low catalyst activity, low reaction rates and the largest required catalyst volume. Higher levels of carbon monoxide in the inlet process gas require a very low inlet temperature which may be too low to initiate and achieve a sufficient reaction rate.

An actively-cooled bed allows for higher process inlet temperatures, higher average bed temperatures and reaction rates, and active cooling maintains an exit temperature for the gas at or below the critical outlet temperature. The required catalyst volume with an actively-cooled system at the same exit temperature and the same exit carbon monoxide levels as the adiabatic bed are smaller than the required catalyst volume for a purely adiabatic bed.

U.S. Pat. No. 3,825,501 granted Jul. 23, 1974 to J. R. Muenger discloses a muli-stage shift converter which includes an initial adiabatic portion followed by an actively cooled isothermal portion, which in turn is followed by an equilibrium-limited actively cooled portion. The coolant in the actively cooled isothermal portion reaches the temperature of the effluent gas stream from the adiabatic portion so as to hold the temperature of the gas stream steady through the isothermal portion. Thus the temperature of the coolant must rise to the temperature of the gas stream in the isothermal portion of the shift converter. The coolant, if a liquid, must be at a very high pressure in order that its temperature can increase; or the coolant may be steam which can operate at lower pressures than a water coolant. The coolant in the equilibrium-limited actively cooled portion is process gas. The process gas coolant will have its temperature rise in the equilibrium-limited portion of the shift converter so that the process gas will be preheated before the process gas enters the adiabatic portion of the shift converter. The use of a coolant which heats up as it cools the process gas requires a large volume coolant loop and may require very high pressures if a liquid coolant is employed.

U.S. Pat. No. 5,464,606 granted Nov. 7, 1995 to R. F. Buswell et al also discloses a shift converter which has an adiabatic portion and an actively cooled portion. The coolant in the actively cooled portion is process gas. The coolant stream process gas is heated as it cools the gas flowing through the catalyst bed.

It would be desirable to have a two stage shift converter which utilizes a coolant in the actively cooled stage which coolant does not substantially increase in temperature in the actively cooled portion of the shift converter. Such a system would allow for a more compact shift converter and one that would not require excessively high coolant pressures.

DISCLOSURE OF THE INVENTION

A carbon monoxide shift converter formed in accordance with this invention includes a first catalytic bed or zone for causing carbon monoxide to convert to carbon dioxide and hydrogen adiabatically; and a second bed or zone downstream from the first catalytic bed or zone which has its temperature controlled by an active cooling pressurized water coolant. Heated process gas is directed into a shift converter having a catalytic bed. The catalytic bed has two zones, or separate beds, in series through which the process gas flows. The temperature of the first zone is controlled adiabatically and the temperature of the second zone, positioned downstream from the first zone, is actively controlled by a pressurized stream of water.

It is therefore an object of this invention to provide a compact and efficient shift converter which results in an effluent process gas stream having desirable carbon monoxide levels at desirable gas stream temperatures.

It is a further object of this invention to provide a shift converter of the character described wherein the actively cooled zone in the shift converter is preferably cooled by a pressurized water coolant which cools the process gas stream by boiling so that the temperature of the coolant is not significantly increased in the actively cooled zone of the shift converter. Alternatively, but at the expense of increased pumping power, the pressurized water coolant flow rate may be increased to a high enough rate so as to minimize its temperature rise thereby preventing boiling, or minimizing the amount of boiling which occurs.

These and other objects of the invention will become more readily apparent from the following detailed description of a preferred embodiment thereof when considered in conjunction with the accompanying drawings, in which:

BEST MODE FOR CARRYING OUT THE INVENTION

Figure 1:
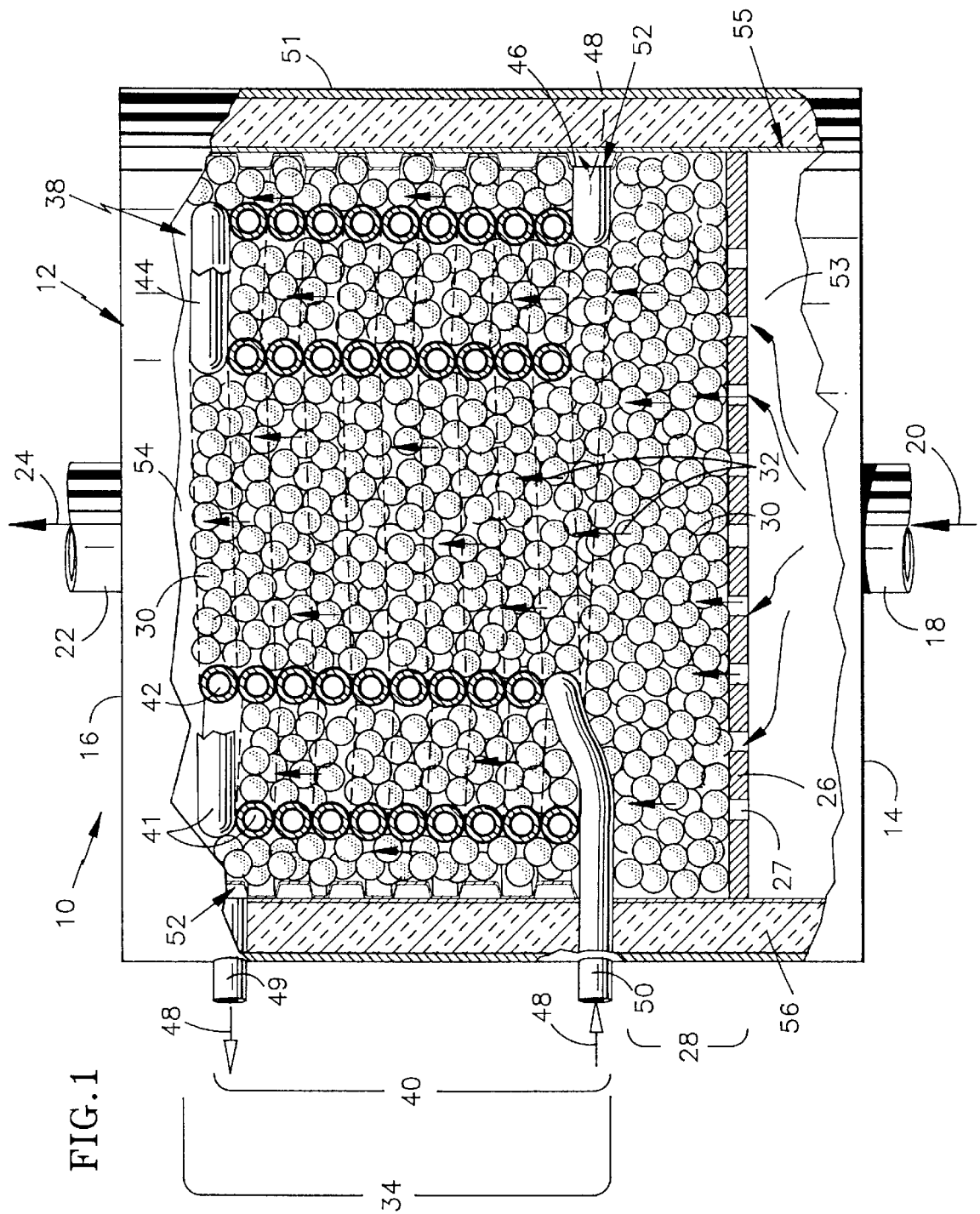
FIG. 1 is a cross sectional view of an embodiment of a shift converter formed in accordance with this invention.

FIG. 1 is a partially broken-away cross sectional view of one embodiment of a shift converter assembly formed in accordance with the present invention. The shift converter assembly, is denoted generally by the numeral 10, and includes a housing having a cylindrical catalyst chamber 12 containing a catalyst bed 30 for causing the desired shift from carbon monoxide to carbon dioxide and hydrogen as set forth in the formula (1). In the shift converter assembly 10, the process gas flows from an upstream end 14 to a downstream end 16 of the catalyst chamber 12 via an inlet 18 and an outlet 22 for the inlet process gas stream 20 and the outlet, or effluent, process gas stream 24, respectively.

As noted above, the housing contains a catalyst bed 30. The catalyst bed 30 is formed of conventional catalytic materials well known to those skilled in this art. Examples of catalysts which may be used include copper and zinc oxide, or copper, zinc oxide and alumina. The catalyst is positioned inside the housing substantially filling the housing. An upstream plenum 53 is formed in the end 14 of the catalyst chamber 12 in order to permit the incoming process gas to be substantially evenly distributed throughout the catalyst bed 30. The catalyst bed 30 is supported on a porous support plate 26 having perforations 27 which support plate 26 is spaced apart from the upstream end 14 of the catalyst chamber 12. A space is left between the top of the catalyst bed and the inside of the downstream end 16 of the catalyst chamber 12 to form a downstream plenum 54 for the processed effluent gas stream 24 exiting the converter assembly 10 via outlet 22.

A downstream zone 34 of the catalyst bed 30 contains an active cooling mechanism to actively control the temperature of the bed and the process gas. The active cooling mechanism is preferentially a heat exchange device which uses a liquid cooling fluid (preferably pressurized water) passing through coolant coils and plate coils. The preferred cooling assembly is a heat exchange device 38 having a plurality of cooling coils 40 disposed throughout the actively cooled zone 34 of the shift converter catalyst chamber bed 30. The cooling coils comprise an exterior loop 41 and an interior loop 42. More than two cooling coils may be included in the actively cooled zone 34 should operating conditions so require.

A plate coil 52 is also positioned on the wall of the catalyst chamber 12 and is in fluid communication with the cooling coils 41. The plate coil 52 is preferably an embossed plate welded to a cylindrical chamber wall 55 so as to form a channel for conducting the cooling fluid around the periphery of the actively cooled catalytic bed zone 34. The inner set of cooling coils 42 is in fluid communication with the outer set of cooling coils 41 through the pipe 44. The outer set of cooling coils 41 is in fluid communication with outer cylindrical plate coil 52 through pipe 46. Preferably, the pressurized cooling liquid stream 48 enters the inner cooling coil 42 via pipe 50 and passes through the inner cooling coils 42 to the outer cooling coils 41 through pipe 44. After passing through the outer cooling coils 41, the cooling liquid then passes into the outer plate coils 52 through pipe 46. The cooling liquid 48 exits the outer plate coil 52 via pipe 49. In the adiabatic zone 28, a cylindrical chamber wall 55 forms the catalyst chamber 12. A layer of thermal insulation 56 may cover the cylindrical chamber wall 55, and an outer protective cylindrical housing 51 may cover the insulation layer 56. The temperature in the adiabatic zone 28 is not actively controlled but is a function of the exothermic catalytic reaction taking place in the bed 30 and is also a function of the inlet temperature of the gas. The chamber, including the plate coil 52 is preferably made of conventional materials such as carbon steel or stainless steel. The preferred material is carbon steel because of cost. The perforated catalyst support plate can be any metal structure, such as perforated metal plate or a suitable grid or heavy screen. The coolant is preferably pressurized water which enters the inlet pipe 50 as a single phase coolant. The coolant water is preferably at a temperature that is about 25° below its boiling point at the coolant pressure, and it exits the pipe 49 as a two phase water-steam mixture. The steam content of the coolant in the pipe 49 is about 20% or less. Cooling of the process gas stream is the result of energy expended in boiling the coolant water in the coolant loops 41, 42 and 52. The temperature of the pressurized coolant water, once it reaches its boiling point, does not increase during the cooling operation.

In operation, a steam reformer (not shown) produces a hydrogen-rich process gas containing hydrogen, carbon dioxide, carbon monoxide, water vapor and unreacted methane. The process gas 20 enters the inlet 18 at a temperature of between about 350° F. and 450° F., with about 400° F. being preferred. The process gas flows into the plenum 53 and through the holes 27 in the porous support plate 26, and enters the adiabatic zone 28 contacting the catalyst 30 therein. Throughout the adiabatic zone 28, the shift conversion reaction (1) of carbon monoxide and water occurs producing carbon dioxide and additional hydrogen.

As the process gas 20 passes through the adiabatic zone 28 contacting the catalyst 30, the shift conversion reaction progresses, the temperature of the process gas increases due to the exothermic heat of reaction so as to produce a high temperature effluent 32. The temperature of the high temperature effluent 32 is between about 450° F. and 550° F., with about 500° F. being preferred. As the high temperature effluent 32 flows through the actively-cooled zone 34, its temperature is controlled by boiling the pressurized water 48 in the heat exchange device 38. The heat exchange water is preferably derived from the fuel cell cooling loop and has a temperature of about 300° F. to about 350° F., and a pressure in the range of about 100–250 psi, with 150 psi being about the preferred pressure. Alternatively a dielectric fluid at the appropriate temperature and an appropriate pressure could be used. The coolant water 48 removes heat from the high temperature effluent 32 by boiling so as to create a low temperature (375° F. to 400° F.), low carbon monoxide content (less than 1%) effluent 24 which exits the shift converter through the outlet 22.

The length or volume of the adiabatic zone 28 determines the percent of carbon monoxide in the high temperature effluent 32 that crosses into the actively cooled zone 34. In an embodiment with an inlet process gas having a carbon monoxide content of about 9% to 12% by volume on a dry basis, the amount of carbon monoxide in the high temperature effluent is desirably between about 1.5% to 4.5%, on a dry basis, with a typical content of about 3%. The appropriate percent of carbon monoxide ensures that sufficient conversion has occurred in the adiabatic zone 28, so that the actively cooled zone 34 need merely convert a small additional amount of carbon monoxide in the high temperature effluent 32. A portion of the carbon monoxide remaining in the high temperature effluent 32 is converted to carbon dioxide with the aid of the actively cooled zone 34 utilizing the shift conversion reaction (1).

Figure 2:
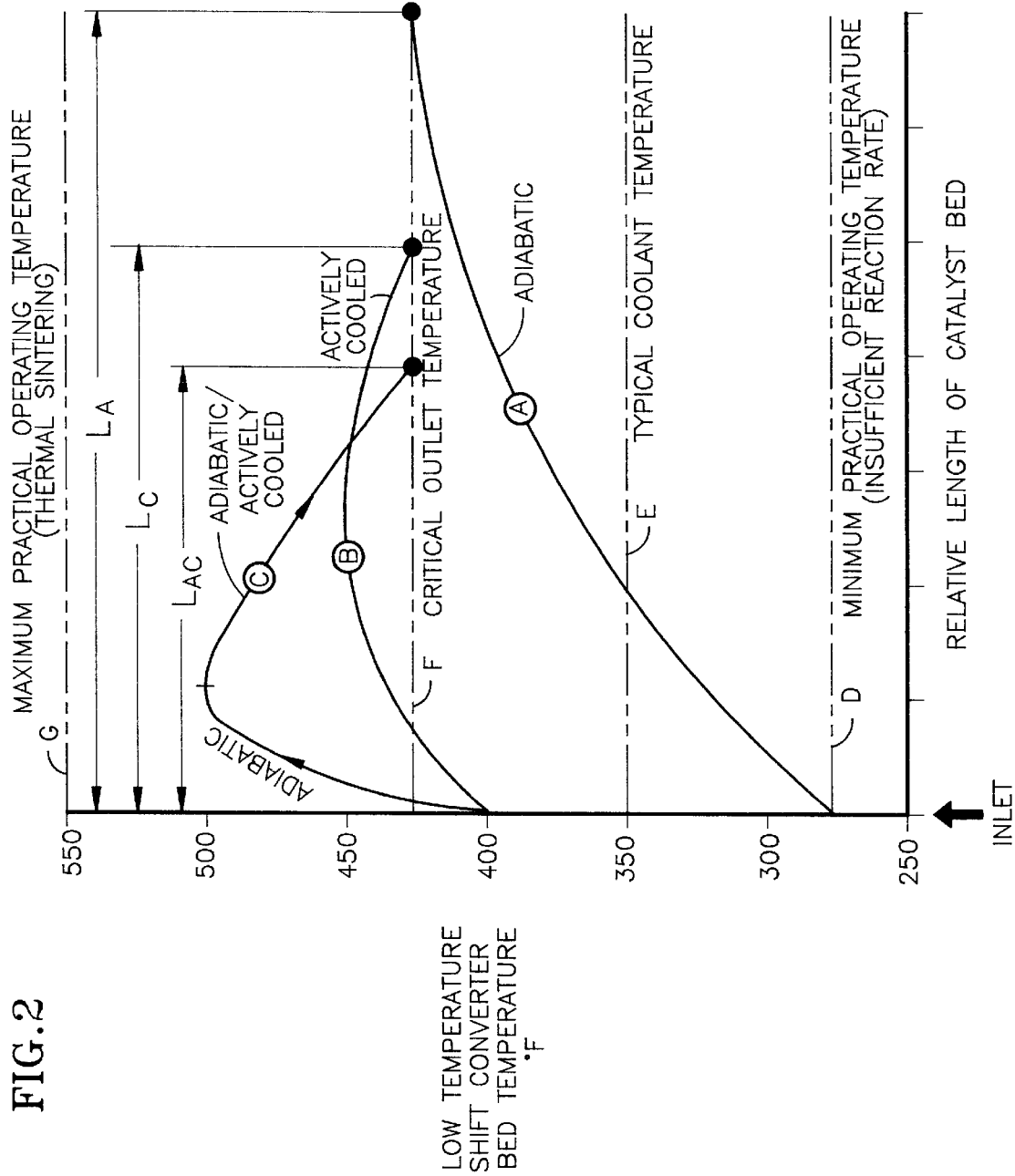
FIG. 2 is a graph plotting operating temperature ranges versus the length of shift converter catalyst beds; and comparing differences between a shift converter utilizing the present invention and prior art shift converters.

FIG. 2 is a graphic representation of analytical heat transfer and kinetic approximations illustrating how a shift converter consisting of an adiabatic zone followed by a pressurized water-cooled zone requires less total shift catalyst volume or length than either a solely adiabatic or a solely actively cooled shift converter to achieve the same resultant carbon monoxide concentration in a process gas. Curve A represents the process gas or bed temperature profile throughout the bed for a solely adiabatic shift converter. Curve B represents the temperature profile for a solely actively cooled shift converter. Curve C represents the temperature profile for a shift converter formed in accordance with this invention, i.e., an adiabatic shift converter zone followed by an actively cooled shift converter zone. It is assumed for this computation that the process gas entering each shift converter has the same inlet carbon monoxide concentration, and that each shift converters A, B, and C all have the same exit or outlet carbon monoxide concentration, and the same exit or outlet temperature which is controlled so as not to exceed the critical outlet process gas temperature, above which damage may occur to the fuel cell. The required length of each shift converter to achieve the desired conversion and outlet temperature is shown as $L_A$ (adiabatic), $L_C$ (actively cooled) and $L_{AC}$ (combined adiabatic-actively cooled).

Four constant temperature lines are also plotted on FIG. 2. The lowest line D is the minimum practical shift catalyst operating temperature plotted here as a nominal 275° F., below which the catalyst activity or reaction rates are insufficient to initiate the shift conversion process. The next line E is a typical coolant temperature, set here as 350° F. The next higher line F is the critical outlet temperature, set here as a nominal 425° F. The highest line G is the maximum recommended catalyst operating temperature, above which thermal sintering will reduce catalyst activity over a period of time. This is plotted at a nominal temperature of 550° F. The bed temperature profile of the adiabatic shift converter, curve A, is the lowest of the three curves A, B and C shown in FIG. 2. The lowest bed temperature also results in the lowest catalyst activity and lowest reaction rate and therefore the largest required catalyst volume to achieve the desired carbon monoxide conversion as shown by the highest relative catalyst bed length. This length is designated as $L_A$. An actively-cooled shift converter temperature profile, curve B, shows that the process gas inlet temperature can be set at a higher temperature shown here at 400° F. The higher average catalyst bed temperature results in increased catalyst activity, which increases the reaction rate. Thus a shorter catalyst bed length is possible, as compared to the adiabatic shift converter, curve A. This length is designated as $L_C$ which is shorter than $L_A$.

A combined adiabatic and pressurized water cooled shift converter, curve C, achieves the highest possible reaction rates by operating at the highest temperature and defers the least amount of exothermic reaction to the latter part of the actively-cooled shift converter. This allows more rapid cooling at the exit of the bed and overall the shortest length of the three shift converters. This length is designated as $L_{AC}$ which is shorter than either $L_A$ and $L_C$. In the adiabatic portion of curve C, the temperature of the process gas increases from a preferred inlet temperature of about 400° F. to about 500° F. which is below the maximum practical operating temperature of 550° F. of the adiabatic portion of the shift converter. The carbon monoxide concentration in the process gas is rapidly reduced to about 3% in the adiabatic zone of the shift converter, leaving only a 3% carbon monoxide content to be converted to carbon dioxide in the actively-cooled portion.

It will be understood that although the present invention has been described in a specific embodiment, various modifications of the specific embodiment of the invention may be made without departing from the inventive concept. Therefore, it is not intended to limit the invention otherwise than as required by the appended claims.

What is claimed is:

1. A shift converter for reducing the amount of carbon monoxide in a process gas, said shift converter having a chamber, said chamber having an inlet for entry of the process gas into the chamber, and an outlet for exit of a low temperature effluent from the chamber, said outlet being disposed downstream of the inlet, said shift converter comprising:

a) an adiabatic catalytic reaction zone having shift converter catalyst disposed therein for exothermally converting a major portion of the carbon monoxide in the process gas into carbon dioxide and hydrogen, thereby producing a high temperature effluent; and b) an actively-cooled catalytic reaction zone positioned downstream from said adiabatic catalytic reaction zone for cooling the high temperature effluent and for creating the low temperature effluent, said actively-cooled zone having a shift converter catalyst disposed therein for converting a minor portion of the carbon monoxide remaining within the high temperature effluent into carbon dioxide and hydrogen, and said actively cooled zone including heat exchange means utilizing a pressurized liquid coolant stream which enters the actively cooled zone as a single phase liquid coolant, and is converted in said actively cooled zone to a two phase liquid-gas coolant without a significant temperature increase due to boiling of said single phase liquid coolant in said actively cooled zone.

2. The shift converter of claim 1 wherein said liquid coolant is water.

3. The shift converter of claim 2 wherein said heat exchange means maintains said water coolant at a pressure in the range of about 100 psi to about 250 psi.

4. The shift converter of claim 3 wherein said heat exchange means maintains said water coolant at a temperature in the range of about 300° F. to about 350° F.

* * * * *